July 11, 1972 J. T. LA MACCHIA 3,675,983

LARGE CAPACITY DIGITAL MEMORY

Filed Feb. 16, 1971 5 Sheets-Sheet 1

INVENTOR
J. T. LAMACCHIA
BY Francis E Morris
ATTORNEY 3,675,983

LARGE CAPACITY DIGITAL MEMORY

John Thomas La Macchia, Berkeley Heights, N.J., assignor to Bell Telephone Laboratories, Incorporated, Murray Hill and Berkeley Heights, N.J.

Filed Feb. 16, 1971, Ser. No. 115,233
Int. Cl. G02b *27/00*
U.S. Cl. 350—3.5 6 Claims

ABSTRACT OF THE DISCLOSURE

A method and apparatus are disclosed for forming a page-organized optical memory that can be read by a single array of photodetectors. Each page of the memory is a hologram. To form each hologram, a beam of light is directed through a converging lens and a page of digital data to a portion of a recording medium located at the focal point of the lens. There the converging beam of light interferes with a reference beam. An aperture in a mask over the recording medium defines the portion of the recording medium where the hologram is recorded. For each subsequent hologram that is recorded, the converging lens and the mask are first moved an equal amount in the same direction parallel to the surface of the recording medium; and the above-described hologram forming procedure is repeated. As a result of this recording process, the real image from each hologram stored in the memory can be reconstructed at the same location and therefore read by one array of photodetectors. To distribute the light amplitude on the recording medium more evenly than it is in the Fourier transform plane, either the light beam incident on the converging lens is made slightly diverging or converging or a fly's eye lens is inserted into its path.

BACKGROUND OF THE INVENTION

This invention is related to optical memories and in particular to high-speed, high-capacity, page-organized digital memories.

An optical memory is any type of recording medium that can be interrogated, or read, by optical means. Those that can be used with digital computers store digital data in the form, for example, of a matrix of points at each of which the presence of a particular optical characteristic represents one of two bit values while the absence of the optical characteristics represents the other. The optical properties that are ordinarily used to record digital data are those that alter the amplitude or phase of incident radiation or those that rotate its polarization. Storage densities of such memories are often well in excess of one megabit per centimeter$^2$. To provide large capacity memories on the order of $10^8$ bits or more, the memory is ordinarily divided into several units called pages, not all of which can be accessed simultaneously.

One particularly advantageous type of optical memory is that in which information is recorded in the form of one or more holograms. As is well known, a hologram is a record of the interference pattern produced by the interference of a coherent reference beam a phase-related information-bearing beam from an object. When a hologram is illuminated with one of the two beams used in forming it, the other beam is diffracted from it. In particular, when a hologram is illuminated with the reference beam used in forming it, the information-bearing beam is reconstructed; and an image of the object originally projected by the information beam can be detected. Typically, this image can be either real or virtral depending on how the reference beam illuminates the hologram.

In an article entitled "Hologram Memory for Storing Digital Data," at page 1581 of the IBM Technical Disclosure Bulletin, vol. 8, No. 11 (April 1966), V. A. Vitols describes a method for using holograms in a high-capacity digital memory. In this technique, the object is an opaque sheet bearing regularly spaced index points or bit positions at which are selectively located indicia representing bits of digital data. Illustratively, the presence of a perforation at an index point signifies a "1" bit while the absence of a perforation signifies a "0" bit. The hologram of this page of digital data is formed simply by directing coherent light through the perforations in the sheet to a recording medium where it interferes with a suitable reference beam.

Because very little space is required on the recording medium to store a hologram of as many as several thousand bits of digital data, it is possible to store on different areas of the same recording medium different holograms of different groups or pages of digital data. One simply exposes one area of the recording medium to one data page, then substitutes another data page for the first, lines up an unexposed portion of the recording medium with the new data page and exposes that previously unexposed portion to the new page. The result of such a procedure is to form on the recording medium an array of holograms, each of which is a recording of a page of digital data.

To read the memory, one hologram at a time is illuminated with the reference beam to reconstruct the original information-bearing beam from the data page in such a way that it forms a real image comprised of an array of spots of light representative of the array of apertures in the otherwise opaque data page used to form the holograms. Appropriate read-out devices such as an array of photo-detectors are then used to sense the presence or absence of particular spots of light in the real image. As disclosed by F. M. Smits and L. E. Gallaher in "Design Considerations for a Semipermanent Optical Memory," Bell System Technical Journal, page 1267 (July-August, 1967), the read-out equipment might be an array of photodetectors and associated circuitry.

Such a system as that described above is extremely attractive. A hologram inherently has optical properties similar to those of a lens. Hence, separate lenses are theoretically not required to image the contents of the hologram memory onto the array of photodetectors. Second, because the resolution obtainable in a unity-magnification imaging situation is close to the maximum theoretical limit, each light spot that is imaged onto a photodetector is as small and as intense as possible. Lastly, the capacity and speed of the hologram memory system are quite high. In their article, Smits and Gallaher demonstrate that the capacity of the memory is in excess of $10^8$ bits if the data is stored in the form of approximately $10^4$ holograms each containing approximately $10^4$ bits of data. Moreover, the access time to any one hologram can be less than ten microseconds (10 $\mu$sec.)

However, for such a system to be practical, it is necessary to use only one array of photodetectors to read the bits of data stored in every one of the holograms of the memory. This requires that the real image reconstructed from each one of the holograms be formed at only one location, namely the plane in which the photodetector array is situated. One way to effect such reconstruction is to move the hologram array mechanically to align each reconstructed image, in turn, with the photodetector array. Such mechanical movement during read-out, however, is slow and cumbersome. Another way is disclosed in R. J. Collier and L. H. Lin's U.S. Pat. No. 3,530,442 on a Hologram Memory. Their apparatus, however, requires an elaborate light beam deflector and a special array of focusing holograms to create a memory in which the real image from each hologram is reconstructed at the same location.

It is also desirable to make the hologram memory relatively insensitive to blemishes or dust on the hologram recording medium so that a small blemish or dust particle on the hologrgam memory cannot obscure or change a bit of digital data. Clearly, this advantage can be achieved if the information from each information-bearing beam is stored throughout one hologram, rather than in a small area. Just such storage can be achieved by recording each page of digital data in the form of a hologram of the Fourier transform of the data page.

As is well known, the Fourier transform of the amplitude and phase distribution of radiation at a first location in a beam of radiation is simply an amplitude and phase distribution at a different location in the beam that is a mathematical Fourier transform of the first distribution. Such a Fourier transform may be made in several ways. For example, with optical techniques, if the amplitude and phase distribution that is to be transformed, namely, the page of digital data, is located in the front focal plane of a lens, then the Fourier transform of this distribution is formed in the rear focal plane, which is also called the Fourier transform plane. Alternatively, if the amplitude and phase distribution that is to be transformed is located in a converging light beam formed by a beam of parallel light that is incident on a converging lens, then the Fourier transform of this distribution multiplied by a spherical phase factor is formed in the focal plane of the converging lens. Further details about Fourier transforms and about optical Fourier transforms may be found in R. Bracewell's The Fourier Transform and its Applications (McGraw-Hill, 1965); J. W. Goodman's Introduction to Fourier Optics (McGraw-Hill, 1968); and S. G. Lipson and H. Lipson's Optical Physics (Cambridge University Press, 1969).

Although it is relatively easy to form the optical Fourier transform of a distribution of radiation, it is not always so easy to record a Fourier transform of an ordered array of light beams. Specifically, an ordeerd array of light beams such as those produced by the apertures of the data page used in a hologram memory is described mathematically as having an amplitude and phase distribution that is comprised of an ordered array of sharp, high-amplitude peaks or spikes of constant phase; and the Fourier transform of such an amplitude and phase distribution is a second ordered array of sharp, high-amplitude and high-intensity peaks or spikes in which each spike in the first array contributes something to the amplitude and intensity of every one of the spikes in the second array. The enormous difference in intensity, however, between the light in the Fourier transform spikes and that in the surrounding regions may make it difficult to record the Fourier transform in the linear region of response in the recording medium. Consequently, in applications such as holography where a linear recording response is desired in order to avoid distortions, it is desirable to find some way to distribute the light more evenly over the plane where the recording takes place.

One method that has been proposed for attaining a more even light distribution in the recording plane is that the phase of an ordered array of light beams incident on the Fourier transforming lens be shifted randomly by a diffuser because it can be shown that if the phase of the light is so shifted then the amplitude distribution in the recording plane is indeed substantially uniform. However, random phase shifting during hologram formation produces a speckle pattern in the reconstruction of the original data page. Such a speckle pattern may be a serious defect because the light level in particular reconstructed spots of light in the data page may be reduced so low that the presence of a light spot cannot be detected by the read-out device. Obviously, where each spot of light represents a binary bit that forms part of a unit of information, it is not practical to run the risk of having bits altered by indiscriminate phase shifting.

Another method that has been proposed is that the hologram recording be made not in the rear focal plane, which is the Fourier transform plane of the Fourier transforming lens, but near this plane. Because the hologram is recorded outside the Fourier transform plane, the transform is defocused with the result that the light amplitude at the recording medium is more evenly distributed. Such a defocused hologram that is recorded close to the Fourier transform plane may be referred to as a near Fourier transform hologram. However, while this recording technique can result in more even light distribution, the optical system that must be used with such a method to form an array of holograms is considerably more complicated and more expensive than the optical system that is used for forming arrays of holograms in the exact Fourier transform plane.

SUMMARY OF THE INVENTION

Accordingly, it is an object of this invention to provide an improved optical memory.

It is a further object of this invention to facilitate the recording of an array of holograms from each of which an image can be reconstructed at the same location.

And it is still another object of this invention to improve the recording of arrays of near Fourier transform holograms in which the amplitude in each hologram is distributed more evenly over the recording plane than it is in the Fourier transform plane.

In an illustrative embodiment of my invention, certain of these objects are achieved by using a Fourier transform arrangement in which each Fourier transform hologram is formed by directing a beam of parallel light onto a converging lens. The first page of digital data that is to be recorded as a hologram is located in the path of the converging light beam from this lens; and the Fourier transform of this page of data is formed at the focal point of the converging lens. There a hologram is formed on a portion of a hologram recording medium by interfering the coverging light beam with a phase-related reference beam. The particular portion of the recording medium where the hologram is formed is defined by an aperture in an otherwise opaque mask that covers the recording medium.

Different Fourier transform holograms of different pages of digital data are then recorded in a similar fashion on different portions of the hologram recording medium all located at the focal point of the coverging lens. To make it possible to reconstruct the image from each hologram at the same location, the positions of the lens and the aperture for each hologram recording are altered by equal amounts in the same direction so that the focal point of the converging lens always coincides with the portion of the recording medium where the hologram is being recorded. This is most readily accomplished by appropriate shifting means that are coupled to the converging lens and the mask. Although this method does require mechanical shifting of the lens and the mask to form the memory and therefore is relatively slow, speed of formation of the memory is not a critical factor. Thus, by using mechanical motion during the formation of the memory where the slowness of such motion can be tolerated, it is possible to avoid all mechanical motion during the read-out of the memory where the slowness of such motion generally cannot be tolerated.

In order to obtain a more uniform light distribution on the hologram recording medium, several alternative modifications can be made in the beam of converging light. One method is disclosed in the copending patent application of C. B. Burckhardt on Fourier Transform Recording, Ser. No. 868,485, filed Oct. 22, 1969 and assigned to Bell Telephone Laboratories, Incorporated.

This method uses a special phase mask to introduce into each light beam, from a different perforation in the data page, a randomly determined phase shift that is constant across that individual light beam. A second method is to direct a slightly diverging or converging light beam, instead of a parallel light beam, at the converging lens. Because the recording medium is located at the focal point of the converging lens, the Fourier transform of such a beam will be formed at some plane other than that of the recording medium. However, because the light beam is only slightly diverging or slightly converging when incident on the converging lens, the location of the Fourier transform plane is close to the recording medium. Hence, this type of hologram recording may also be referred to as a near Fourier transform hologram. Alternatively, still another type of defocused Fourier transform hologram may be obtained by inserting a fly's eye lens array in front of either the converging lens or the page of digital data.

DETAILED DESCRIPTION OF THE DRAWING

Figure 1:
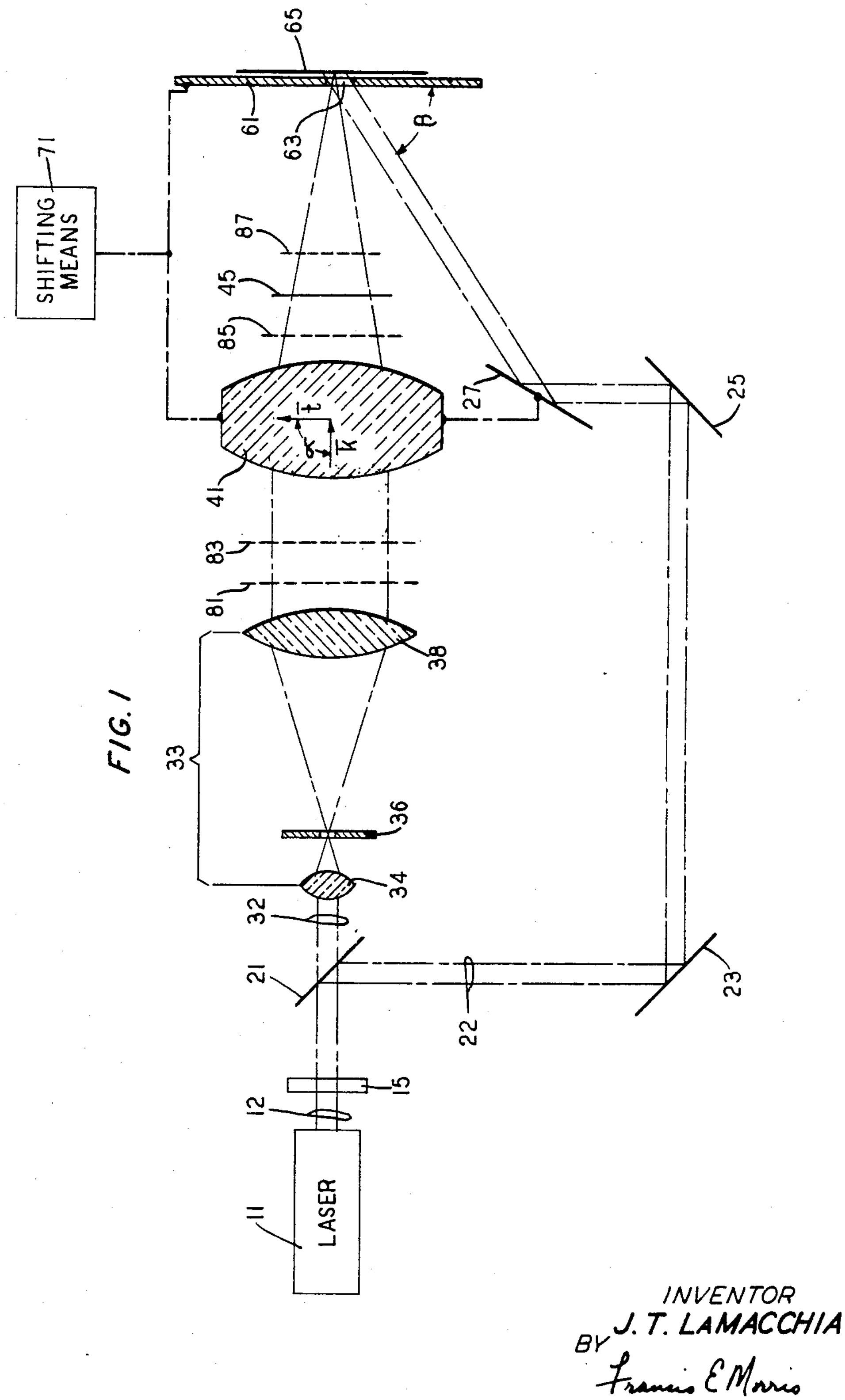
FIG. 1 is a schematic representation of illustrative apparatus used to form the optical memory of my invention.

Illustrative apparatus used in forming the hologram memory is shown in FIG. 1. This apparatus comprises a source of coherent radiation, means for forming radiation from this source into two beams of coherent radiation, means for modulating one of these beams and forming its Fourier transform, and means for interfering the two beams on a portion of a hologram recording medium. Typically, this apparatus is mounted by appropriate means (not shown) on an optical table (also not shown). The source of coherent radiation is laser 11. It produces a beam 12 of coherent radiation that is directed through a shutter 15 to a beam splitter 21. This beam splitter divides beam 12 into two beams 22 and 32. Beam 22 provides a reference beam while beam 32 is modified as described below to form an information-bearing beam.

Reference beam 22 from beam splitter 21 is deflected by reflectors 23 and 25 to reflector 27. From there it is directed at an angle $\beta$ through an aperture 63 in an otherwise opaque mask 61 onto a recording medium 65 that is immediately behind mask 61 and parallel to it. Aperture 63 defines the portion of recording medium 65 on which the hologram is recorded. Typically, aperture 63 is about one millimeter square. Simultaneously, beam 32 is first expanded by beam expander 33 comprising a positive lens 34, a pinhole 36 and an objective lens 38. This expanded beam is a plane parallel beam propagating in the direction indicated by the propagation vector $k$. Beam 32 is incident on a converging lens 41 that converges the plane parallel beam to a focus in the plane of recording medium 65. This focus is located behind aperture 63 in mask 61 so that beam 32 passes through the aperture to recording medium 65. In converging to a focus, beam 32 traverses a data plane 45 where there is located a page of digital data comprising the presence or absence of transparent regions in an otherwise opaque medium. Ordinarily, data plane 45 is located quite close to lens 41. For clarity in FIG. 1, however, plane 45 is shown separated an appreciable distance from lens 41.

Figure 2B:
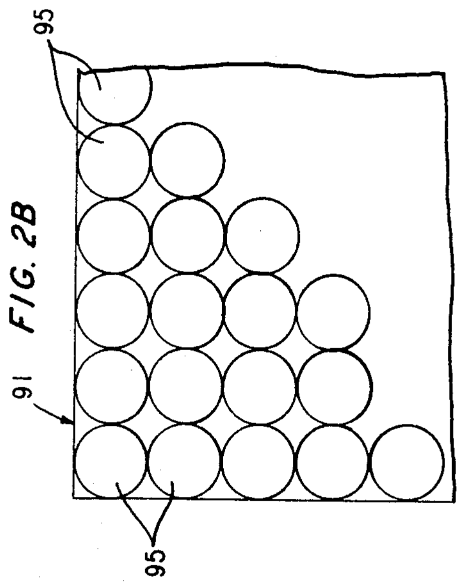
FIG. 2 is an illustrative representation of certain elements of FIG. 1.
Figure 2A:
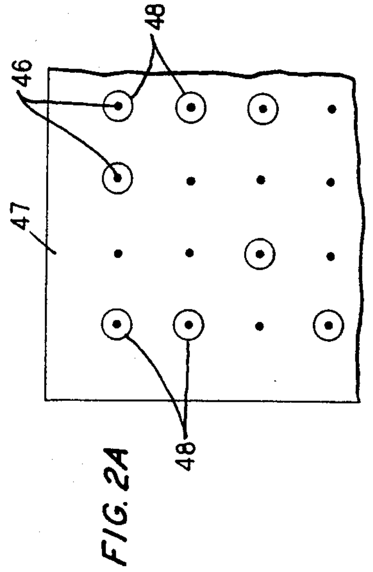

An illustrative page of digital data is shown in FIG. 2A. At regularly spaced index points 46 in an otherwise opaque medium 47, there are located either transparent regions 48 representing, for example, a "1" bit or the absence of such transparent regions representing a "0" bit. Typically, medium 47 is two centimeters square, the spacing between the centers of adjacent index points 46 is 250 microns, and the size of a transparent region 48 is about 100 microns. This page of digital data modulates beam 32 to form an information-bearing beam.

As a result of this arrangement, reference beam 22 and information-bearing beam 32 both pass through aperture 63 and are incident on recording medium 65. Because these two beams are derived from a single source of temporally coherent radiation, the two beams interfere on the portion of recording medium 65 behind aperture 63 to form a hologram of the page of digital data; and because recording medium 65 intersects the rear focal point of lens 41, the hologram that is formed is a Fourier transform hologram.

As has been emphasized above, the limited dynamic range of typical hologram recording materials makes it difficult to record the Fourier transform of an ordered array of light beams such as is formed by the page of digital data in data plane 45. To provide a more even distribution of the amplitude in the focal plane of lens 41, the above-described phase mask of C. B. Burckhardt is aligned with the page of digital data so as to introduce a constant phase shift across randomly selected bits of digital data and is located with the data page at data plane 45. Other methods that I have devised for providing a more uniform light distribution are described below. In contrast to the Burckhardt method, these techniques form near Fourier transform holograms.

In a similar fashion, additional holograms are formed on other portions of hologram recording medium 65. Before each hologram is formed, mask 61 is shifted so that aperture 63 is located over a previously unexposed portion of hologram recording medium 65; and simultaneously, reflector 27 and lens 41 are adjusted so that reference beam 22 and information-bearing beam 32 are directed through aperture 63 onto recording medium 65. In addition, the adjustment of lens 41 also locates the focal point of that lens at coincidence with the previously unexposed portion of medium 65 where the next hologram is to be recorded. To cause reference beam 22 and information-bearing beam 32 to track the position of aperture 63 in mask 61, to maintain coincidence of the focal point with the recording medium, and to provide for the reconstruction of images from all the halogens SHA reconstruction of images from all the holograms at the same location, I have found that reflector 27, lens 41 and mask 61 should be moved equal amounts on surfaces that are parallel to the surface of recording medium 65. This movement is represented in FIG. 1 by the vector $\bar{t}$ which makes a non-zero angle $\alpha$ with the propagation vector $\bar{k}$ of beam 32. It is understood, of course, that $\bar{t}$ represents motion into and out of the plane of the drawing in FIG. 1 as well as motion up and down as shown in that drawing.

To effect this movement, reflector 27, lens 41 and mask 61 are rigidly coupled to a shifting means 71 so that movement of any one of these three elements in the direction $\bar{t}$ moves the other two elements an equal distance in the same direction. Why this arrangement causes beams 22 and 32 to track the position of aperture 63 and maintains coincidence of the focal point of lens 41 with recording medium 65 is explained below in conjunction with FIG. 3. While this shifting is being made, a new page of digital data consisting of a different arrangement of transparencies 48 at index points 46 in opaque medium 47 is inserted into data plane 45. The location of this new page of data with respect to recording medium 65 is the same as the location of the first page of digital data. Once aperture 63 is lcoated over a previously unexposed portion of recording medium 65 and the new page of digital data is inserted into plane 45, a new hologram is formed on the new page of data.

Figure 3A:
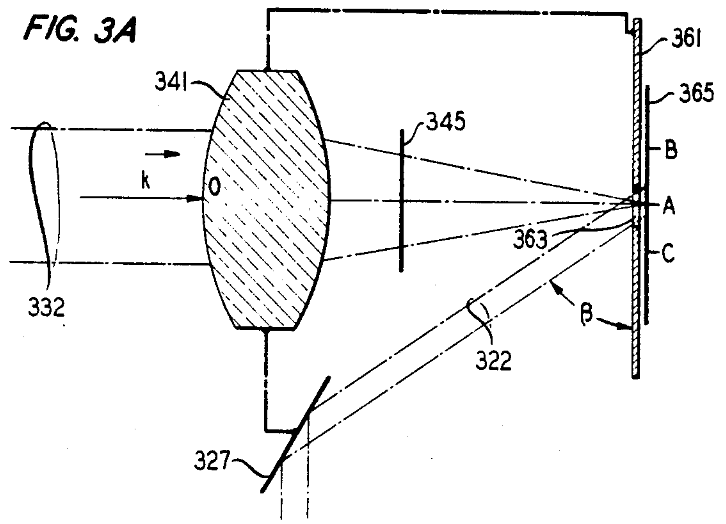
FIG. 3 is a schematic representation showing the relationship between certain elements of FIG. 1 during different recording steps.
Figure 3B:
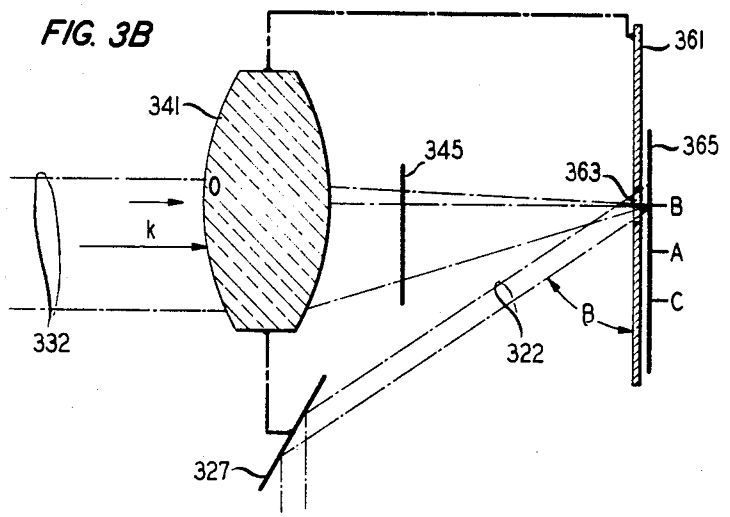
Figure 3C:
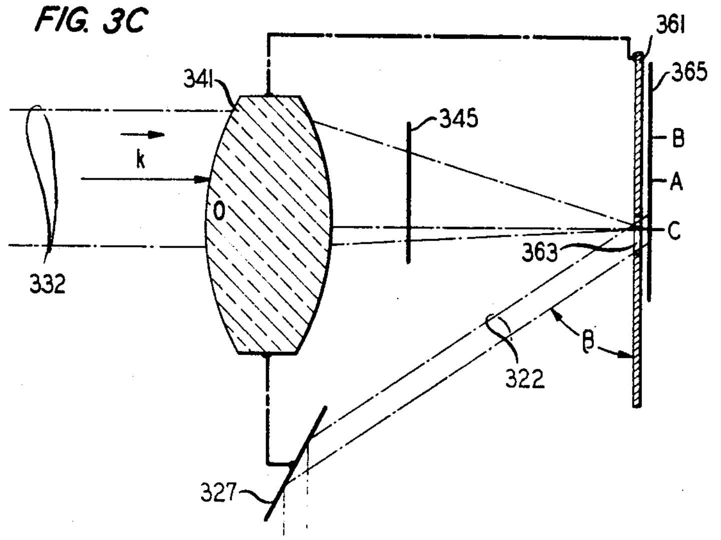

To demonstrate why beams 22 and 32 follow the movement of aperture 63 in mask 61 and the focal point coincides with the recording medium, three representative positions of reflector 27, lens 41, and mask 61 are shown in FIGS. 3A, 3B, and 3C. Here the movement of these elements is up and down in a plane parallel to a planar recording medium. In these illustrations, certain elements of FIG. 1 are represented by the same numerals increased by 300. In addition, the optical axis of lens 341 is represented by OA, OB, and OC in FIGS. 3A, 3B, and 3C, respectively, where A, B, and C are points on recording medium 365. In FIG. 3A, aperture 363 in mask 361 is shown centered on the optical axis OA of lens 341. Because the shifting means always moves lens 341 and mask 361 equal distances in the same direction $\bar{t}$, aperture 363 in FIG. 3B is likewise centered on optical axis OB and aperture 363 in FIG. 3C is centered on optical axis OC. For the same reason, the angle between the propagation vector $\bar{k}$ and the optical axis is the same for every position to which lens 341 and mask 361 are moved. In FIGS. 3A, 3B, and 3C the vector $\bar{k}$ and the axes OA, OB, and OC are parallel and this angle is zero degrees.

At incidence on lens 341, beam 332 is a beam of plane parallel electromagentic radiation. Such a beam of parallel radiation is converged to a point in the focal surface of any lens on which it may be incident; and when its propagation vector $\bar{k}$ is parallel to the optical axis of the lens, this focal point lies on the optical axis of the lens. Thus, in FIGS. 3A, 3B, and 3C where recording medium 365 is located a focal distance away from lens 341, the focal point is represented by points A, B, and C, respectively. Consequently, by moving lens 341 and mask 361 equal amounts in the same direction in parallel planes, information-bearing beam 332 tracks aperture 363; and the focal point of lens 341 always coincides with recording medium 365. Hence, it is possible to record Fourier transforms of different pages of digital data on different portions of recording medium 365. Moreover, as will become apparent below, it is also possible by this step to record on different portions of the recording medium holograms that reconstruct images that are all located at the same position.

Preferably, reflector 327 is also coupled to lens 341 and therefore is moved the same amount lens 341 is moved and in the same direction. As a result of this alignment, the angular relationship and distance between reflector 327 and aperture 363 remains constant and reference beam 322 is always incident on reflector 327 at the same angle. Consequently, movement of reflector 327 causes beam 322 to follow the movement of aperture 363. As a result, for every position of aperture 363, both reference beam 322 and information-bearing beam 332 are directed through aperture 363 in mask 361 and interfere on recording medium 365 to form a Fourier transform halogram.

As indicated above, it is also possible to form a more uniform light distribution on the recording medium by recording the holograms near the Fourier transform plane but not in it. In contrast to previously disclosed techniques, however, I introduce a slight divergence or convergence into the light beam that is incident on converging lens 41 so that it is not a parallel beam but continue to record the hologram at the focal point of converging lens 41. The amount of this divergence or convergence is such that the Fourier transform is displaced from the plane of medium 65 enough that the amplitude distribution on recording medium 65 is sufficiently uniform to be within the dynamic range of the recording medium. The amount of displacement required will, of course, vary with the particular material used as a recording medium as well as the periodicity and the number of bits in the page of digital data. Typical displacements are about one to two percent of the focal length of lens 41. The amount of displacement can be controlled simply by varying the position of objective lens 38 with respect to pinhole 36.

Figure 3D:
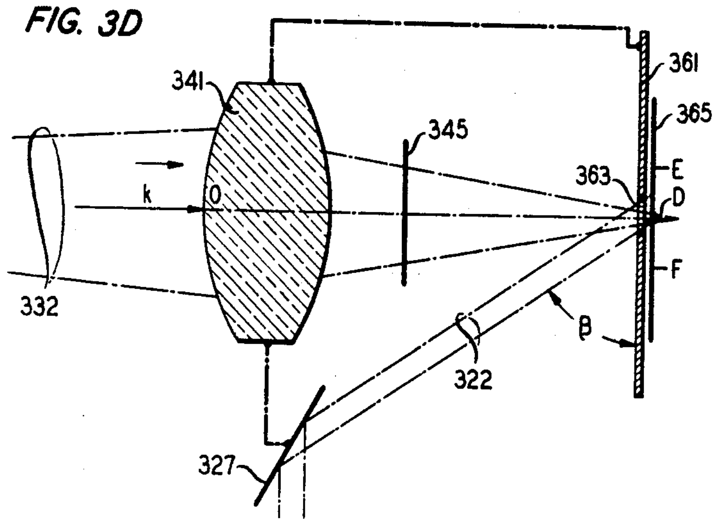
Figure 3E:
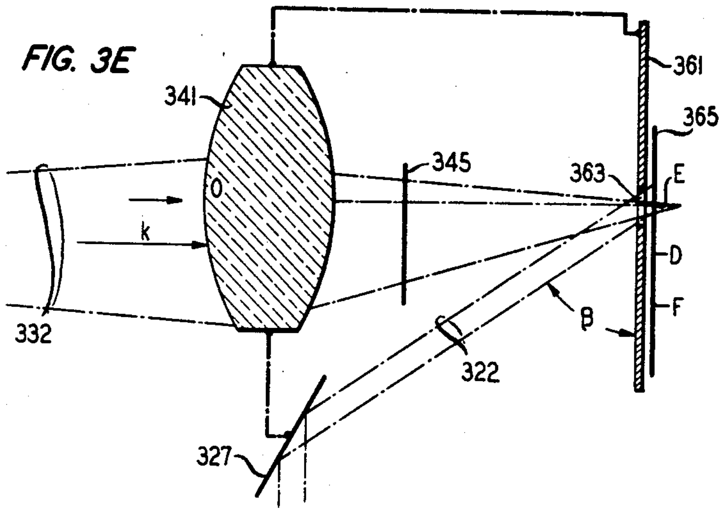
Figure 3F:
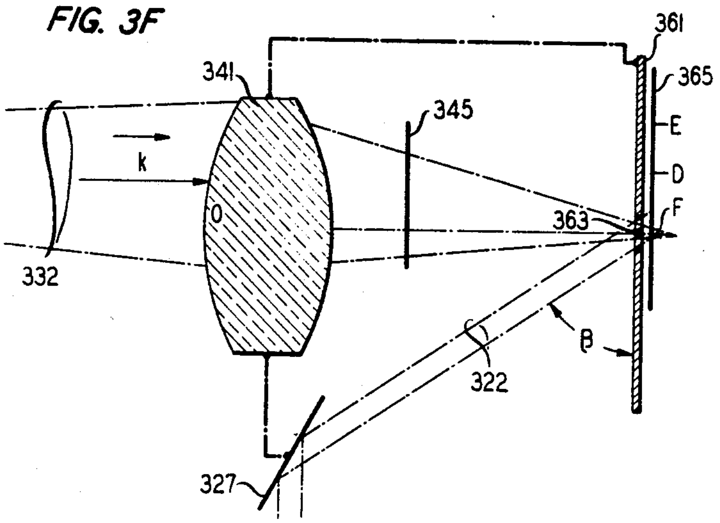

In contrast to prior art systems in which near Fourier transforms are recorded at some point other than the focal point of the converging lens, my method for forming near Fourier transforms is compatible with my method for recording an array of holograms that reconstruct real images at the same location. Moreover, it does not require any elaborate optics. Three representative positions of reflector 27, lens 41, and mask 61 are shown in FIGS. 3D, 3E, and 3F illustrating the recording of near Fourier transformers according to my teachings. These illustrations are similar to those of FIGS. 3A, 3B and 3C and the various elements in them are numbered in the same way. In this case, however, beam 332 is a slightly diverging beam at incidence on lens 341, the focus of this beam is to the right of (or behind) recording medium 365, and the optical axis of lens 341 passes through points OD, OE, and OF in FIGS. 3D, 3E, and 3F, respectively. Aperture 363 in mask 361 is centered on optical axis OD of lens 341. Because the shifting means always moves lens 341 and mask 361 equal distances, aperture 363 in FIGS. 3E and 3F is likewise centered on axes OE and OF, respectively. Similarly, the focal point of lens 341, which is the point of focus of a beam of parallel light incident on lens 341, still coincides with recording medium 365 and is represented by points D, E, and F in FIGS. 3D, 3E, and 3F, respectively. Consequently, even though beam 332 is diverging at incidence on lens 341, it still tracks the position of aperture 363; and even though beam 332 comes to a focus behind recording medium 365, the focal point of lens 341 is always located at the recording medium.

Alternatively, a low-density fly's eye lens array may be inserted into beam 32 in FIG. 1 either between lenses 38 and 41 as represented by plane 81 or between lens 41 and data plane 45 as represented by plane 85. As is well known, a fly's eye lens array is an array of small lenslets each of which typically has a diameter of about 400 microns and a short focal length. In contrast to such lenses with a relatively high density of lenslets, I prefer to use a low-density, high *f*-number fly's eye lens array in which each lenslet has a diameter of approximately 2.5 millimeters and a focus at some plane in front of recording medium 65. Such a lens is shown as element 91 in FIG. 2B. Individual lenslets are indicated by the numeral 95.

When fly's eye lens 91 is located in beam 32 at plane 81, each lenslet focuses beam 32 to form a Fourier transform of a portion of beam 32. The location of the Fourier transform plane of these lenslets is shown at position 83 in FIG. 1. Alternatively, when fly's eye lens 91 is located at position 85 between lens 41 and data plane 45 an array of Fourier transforms of different portions of beam 32 is formed at some plane 87 in front of recording medium 65 about halfway between lens 41 and medium 65. In effect, the use of fly's eye lens 91 at either position segments the one transform that would otherwise be formed on recording medium 65 into an array of as many Fourier transforms as there are individual lenslets in array 91 and locates these transforms at planes 83 or 87. Fourier transform planes 83 and 87 are far enough away from recording medium 65 that the light in beam 32 that converges to form the array of Fourier transforms at plane 83 or 87 diverges enough by the time it reaches recording medium 65 to form thereon a set of overlapping defocused Fourier transforms of the different portions of the page of digital data. Because of this overlapping, a more uniform distribution of light is obtained in the plane of recording medium 65.

Care should be taken in forming this overlapping set of defocused Fourier transforms to make sure that most of each of the transforms passes through aperture 63 in mask 61. To obtain this light distribution, the precise position of a fly's eye lens array can readily be worked out from standard lens formulae. In practice, it probably is simpler merely to slide fly's eye lens array 91 along the optical axis of the system until the desired light distribution is obtained.

Again, for the reasons set forth in discussing the various recordings depicted in FIG. 3, it can be shown that recordings of different sets of overlapping defocused Fourier transforms also track the movement of aperture 63 in mask 61. Consequently, for each different position of lens 41 and aperture 63, the corresponding set of overlapping defocused Fourier transforms is directed through aperture 63 and recorded as a hologram on recording medium 65.

Figure 4:
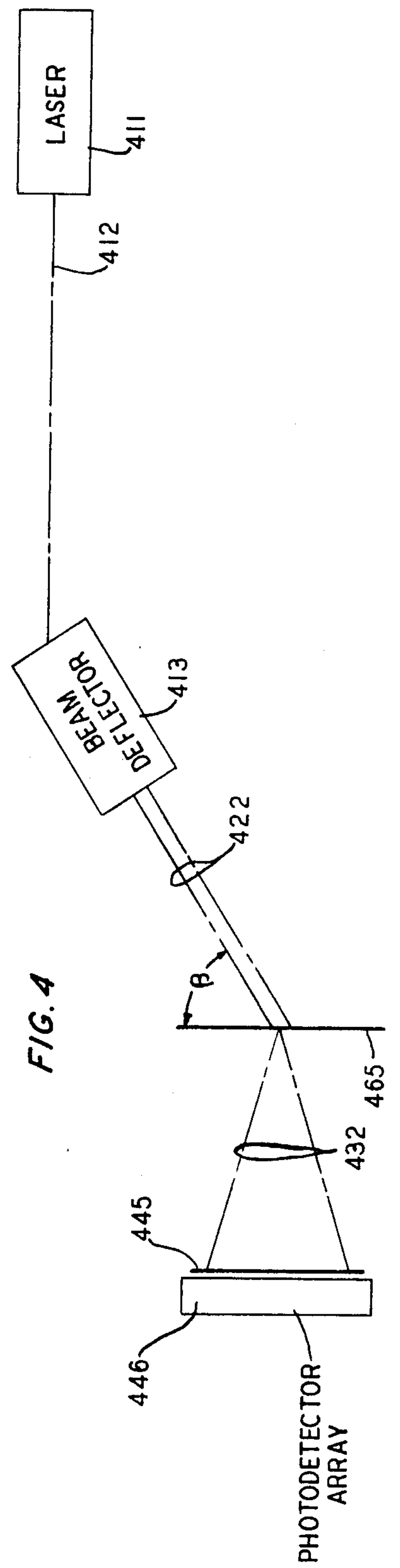
FIG. 4 is a schematic representation of illustrative apparatus used to interrogate, or read, the optical memory formed with the apparatus of FIG. 1.

Illustrative apparatus for reading the data stored in the hologram memory is shown in FIG. 4. This apparatus comprises a laser 411, a light beam deflector 413, a hologram array 465, and a photodetector array 446. To read a particular hologram in the array, a beam 412 of coherent radiation from laser 411 is directed to light beam deflector 413. This deflector is a conventional device capable of forming the light beam into a plane parallel beam and deflecting it down any one of a large number of possible parallel paths. There should be as many such paths as there are different holograms stored in hologram array 465; and each path should be aligned with a different hologram. An illuminating light beam 422 propagating down one such path is shown in FIG. 4. Light beam 422 from beam deflector 413 is incident on hologram array 465 at an angle $\beta$ traveling in a direction opposite that of reference beam 22 during the formation of the hologram. Thus, beam 422 is the conjugate of reference beam 22.

When the conjugate of the reference beam is incident on a hologram, what is reconstructed from the hologram is the conjugate of the original information-bearing beam. Thus in FIG. 4, illuminating beam 422 reconstructs from the hologram the conjugate 432 of the information-bearing beam. Beam 432 propagates toward photodetector array 446 and forms a real image 445 of the data page used in forming the hologram. The location of this real image with respect to hologram array 465 is the same as the original location of the data page in plane 45 with respect to hologram array 65 of FIG. 1. As is shown in FIG. 4, photodetector array 446 is located immediately behind image 445. Photodetector array 446 contains as many photosensitive devices as there can be spots of light in image 445, one such device being aligned opposite each position where a spot of light can be formed. The presence or absence of a light spot opposite each photosensor can thus be transformed into an electric signal; and this signal can be stored, for example, in a flip-flop in a buffer memory.

To read out the contents of other holograms, beam deflector 413 merely shifts light beam 412 to another path to form an illuminating beam 422 that is incident on a different portion of the hologram recording medium. Again, beam 422 is the conjugate of reference beam 422 used in forming the hologram. Consequently, the conjugate of the information-bearing beam is reconstructed and directed toward photodetector array 446.

Figure 5A:
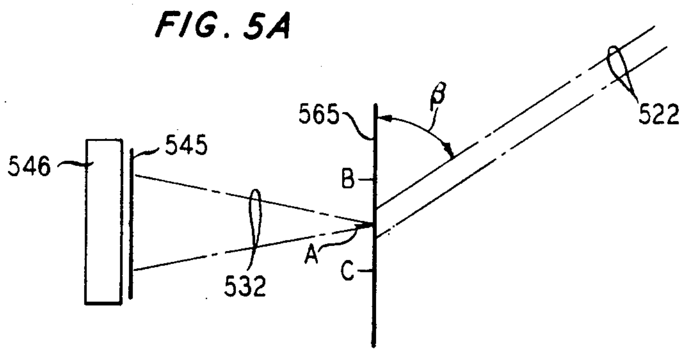
FIG. 5 is a schematic representation showing the relationship between certain elements of FIG. 4 during different interrogating steps.
Figure 5B:
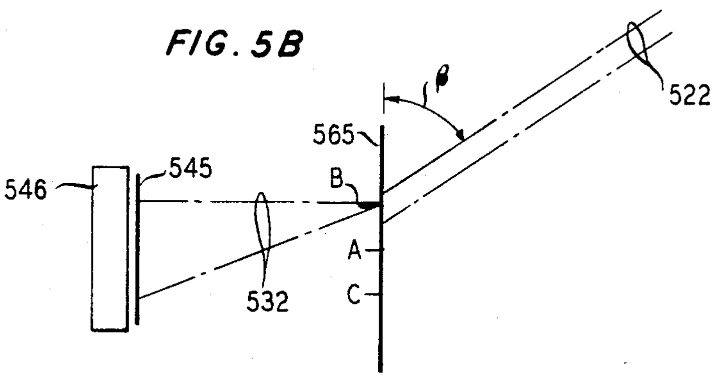
Figure 5C:
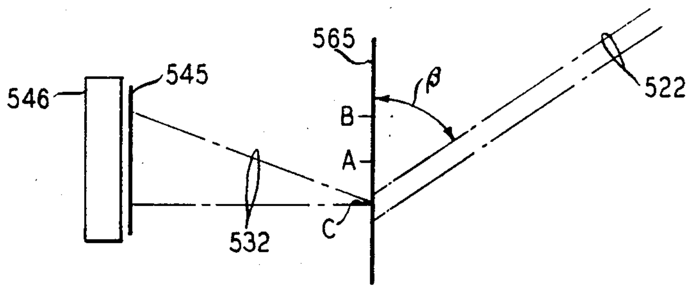

By comparing FIGS. 5A, 5B, and 5C, which detail the reconstruction process from three different holograms with FIGS. 3A, 3B, and 3C, which detail the formation of three different holograms, it is possible to see that every one of the reconstructed information-bearing beams 532 from hologram array 565 forms and image 545 at the same location with respect to the photodetector array. The elements of FIGS. 5A, 5B, and 5C are similar to those shown in FIG. 4; and accordingly, they have been numbered in the same fashion incremented by 100. Also shown at A, B, and C are three holograms that correspond to the three holograms formed at A, B, and C in FIGS. 3A, 3B, and 3C, respectively. In FIG. 5A, illuminating beam 522 is incident at A to reconstruct from the hologram recorded there the conjugate 532 of information-bearing beam 332. The conjugate beam propagates in exactly the reverse direction of beam 332. Hence, it forms an image 545 that bears exactly the same spatial relation to the hologram at A as the page of digital data at plane 345 bore to hologram at A in FIG. 3A. Similarly, in FIG. 5B, illuminating beam 522 reconstructs from the hologram at B the conjugate 532 of the information-bearing beam 332 used in forming the hologram at B. Again, the image 545 formed by this beam bears exactly the same relation to the hologram at B as plane 345 bore to the hologram at B in FIG. 3B. In a similar fashion in FIG. 5C, reconstructed image 545 bears the same spatial relation to the hologram at C as plane 345 bore to the hologram at C in FIG. 3. However, in each of the cases in FIG. 3, the page of digital data at plane 345 had a constant position with respect to the hologram recording medium. Thus in FIG. 5, each reconstructed image at plane 545 similarly has the same position with respect to the hologram recording medium 565. As a result, it is possible to reconstruct from each of the holograms in array 465 or 565 an image that is located at the same position.

In a similar fashion, this same analysis also applies to reconstrutcions from holograms formed with my near Fourier transform or defocused Fourier transform techniques described above. Again, each hologram in the array reconstructs an image that is located at the same position with respect to the hologram recording medium when the hologram was recorded.

In practicing my invention I have formed arrays of holograms using each of the techniques described above. For example, I have stored approximately 16 million bits of data in a hologram array by recording a 64 x 64 array of holograms each of which was a record of a page of 4,096 bits of digital data. These 4,096 bits were arranged on each page of data in the form of an 8 x 8 array of arrays of 64 bits each. Recording was accomplished using a slightly diverging beam 32 incident on an $f/10$ converging leans 41 with a focal length of 20 centimeters. From lens 41 the converging light was directed through the page of digital data to the hologram recording medium. Simultaneously, a reference beam was also directed onto the recording medium; and the resulting interference pattern was recorded as one of the holograms of the optical memory. For every other hologram that was recorded, the converging lens, the mask, and the reflecting surface that directed the referenec beam at the aperture in the mask were all moved equal amounts in the same direction so that the aperture was located over a previously unexposed portion of the recording medium. A new page of digital data was inserted into the apparatus; and a new hologram was then recorded.

In other experimental work, I have also recorded smaller memories using the phase mask described in the above-identified patent application of C. B. Burchardt or fly's eye lens arrays with an $f$-number of about 80 located either at plane 81 or plane 85 in FIG. 1.

As will be obvious to those skilled in the art, numerous modifications can be made in the above-described method and apparatus without departing from the spirit and scope of my invention. For example, any source of coherent radiation may be used in forming the holograms whether or not the beam of radiation from this source is perceivable by a human being. It is not necessary that beam 32 be incident on lens 41 along its optical axis. Any other angle of incidence is acceptable provided the aberrations in lens 41 are corrected for this angle, the recording medium is located at the point of focus of a parallel beam incident at this angle, and the aperture of mask 61 is aligned between lens 41 and this point of focus. In keeping with practice in the optical arts, this point of focus may be described as lying on the focal surface of lens 41. The particular materials on which each page of digital data is initially formed and on which each hologram of this data is recorded may vary widely. Numerous such materials are known to those skilled in the art.

As is also known, there are other techniques for reconstructing the conjugate of information-bearing beam 32. Any of these techniques may be used with my invention provided each reconstructed image is formed at the same location with respect to the hologram recording medium. For example, when the holograms that are recorded can be regarded as thin holograms and the angle between the reference beam and the normal to the hologram recording medium is (90—β) as shown in FIG. 3, the conjugate of the information-bearing beam can also be reconstructed by an illuminating beam that is incident on the hologram array at the angle —(90° —β), as measured with respect to the normal.

What is claimed is:

1. A method for recording an optical memory in which different data is stored sequentially in different portions of the memory comprising the steps of:

(a) forming first and second beams of phase-related coherent radiation;

(b) directing said first beam onto a converging lens to form a converging beam of radiation, said first beam having a first direction of propagation at incidence on said converging lens;

(c) directing said converging beam through, in the following sequence, a fly's eye lens array, a data plane where there is located a first page of digital data and an aperture in an otherwise opaque mask onto a first portion of a recording medium located on the focal surface of the converging lens;

(d) simultaneously directing the second beam of coherent radiation onto the same first portion of the recording medium to record on said medium a first hologram of said first page of digital data;

(e) shifting the converging lens and the aperture in the mask equal amounts in the same direction on surfaces parallel to the recording medium; and (f) recording on a second portion of the recording medium also located on the focal surface of the converging lens a second hologram of a second page of digital data by repeating steps b, c, and d.

2. The method of claim 1 wherein the second beam of coherent radiation is incident on reflecting means that direct the beam through the aperture in the mask, said method further comprising the step of shifting the reflecting means on a surface parallel to those in which the mask and the converging lens are moved, the amount and direction of any movement of the reflecting means being the same as the amount and direction of the movement of the mask and the converging lens.

3. The method of claim 1 wherein the beam that is incident on the converging lens is a non-parallel beam of radiation.

4. An optical memory comprising:

a converging lens on which is incident the first of two beams of coherent radiation derived from a source of coherent radiation;

means for mounting a data source on which is incident the first beam of coherent radiation after it has passed through the converging lens;

a fly's eye lens array located in the path of the first beam of coherent radiation between the converging lens and the data source;

means for mounting a first portion of a recording medium at the focal surface of the converging lens;

means for forming on the first portion of the recording medium a first hologram by interference of the first beam of coherent radiation after it has passed through the data source and the second beam of coherent radiation;

a mask that defines an area of the recording medium on which the two beams of coherent radiation are incident; and means for simultaneously moving the mask with respect to the recording medium and deflecting the first beam to follow the movement of the mask to permit the recording of a second hologram on a second portion of the recording medium, said second portion also being located at the focal surface of the converging lens.

5. The optical memory of claim 4 wherein the means for moving the mask and deflecting the first beam comprise means for simultaneously moving the mask and the converging lens equal amounts in the same direction on surfaces that are parallel to the recording medium.

6. The optical memory of claim 5 further comprising:

reflecting means located in the path of the second beam; and means for moving said reflecting means in a plane parallel to those in which the mask and the converging lens are moved, the amount and direction of any movement of the reflecting means being the same as the amount and direction of the movement of the mask and the converging lens.

References Cited

UNITED STATES PATENTS

| | | | |
|---|---|---|---|
| 3,584,930 | 6/1971 | Reed | 350—3.5 |
| 3,523,054 | 8/1970 | Heflinger et al. | 350—3.5 |
| 3,604,778 | 9/1971 | Burckhardt | 350—3.5 |

OTHER REFERENCES

Gerritsen et al.: Applied Optics, vol. 7, No. 11, November 1968, pp. 2301–2311.

Buzzard: High Speed Photography, Proc. of the 8th International Congress-Stockholm, June 1968, pp. 335–40.

LaMacchia: Proceedings of the SPIE, 14th Annual Technical Symposium, published by SPIE, Redondo Beach, Calf., 1969, pp. 485–91.

DAVID SCHONBERG, Primary Examiner

R. J. STERN, Assistant Examiner

U.S. Cl. X.R.

350—162 SF